Dec. 20, 1949     E. W. BRIDGE     2,491,950
VEGETABLE TRIMMING MACHINE
Filed Feb. 19, 1947     5 Sheets-Sheet 1
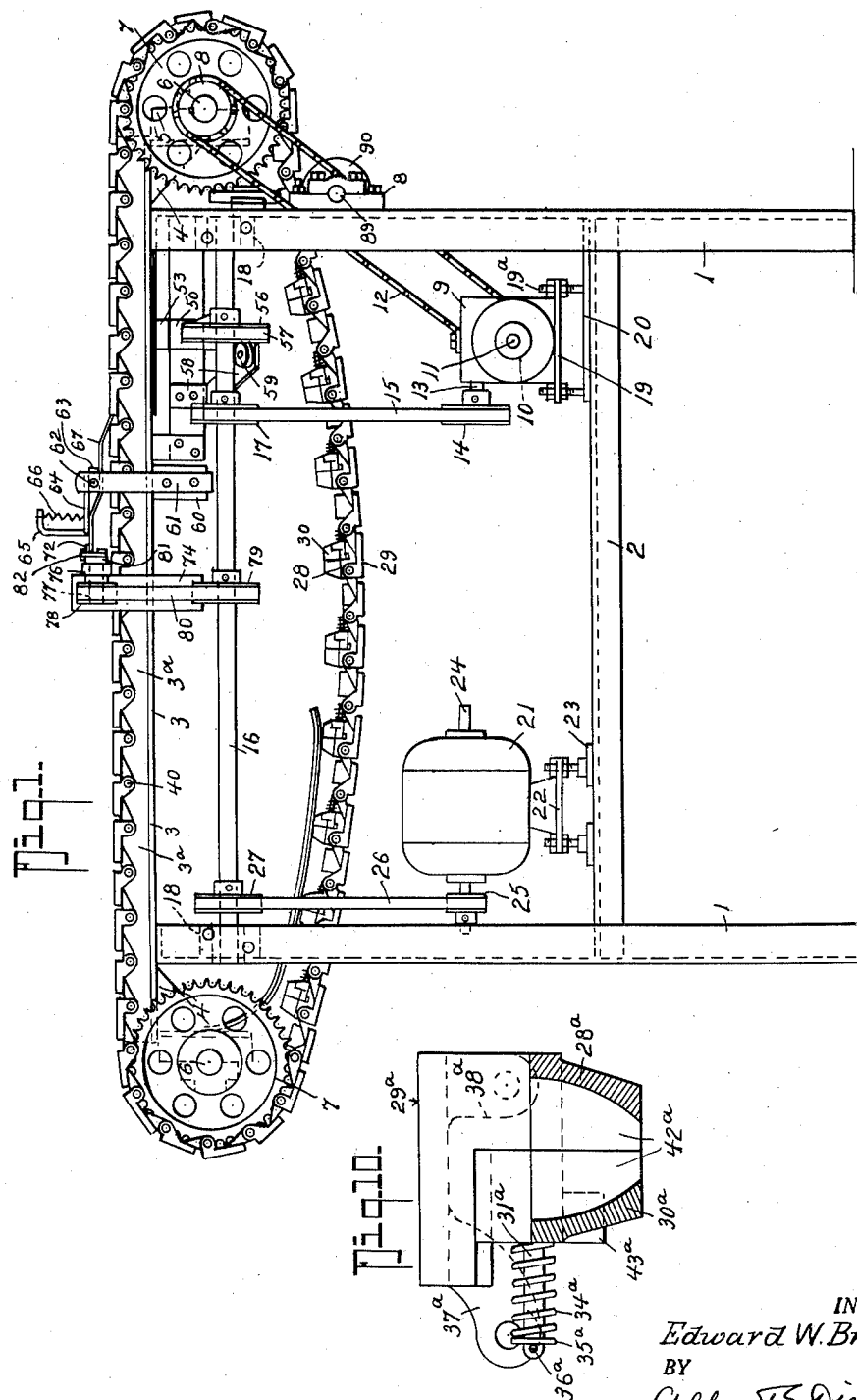
INVENTOR,
Edward W. Bridge,
BY
Albert E. Dietrich,
ATTORNEY.

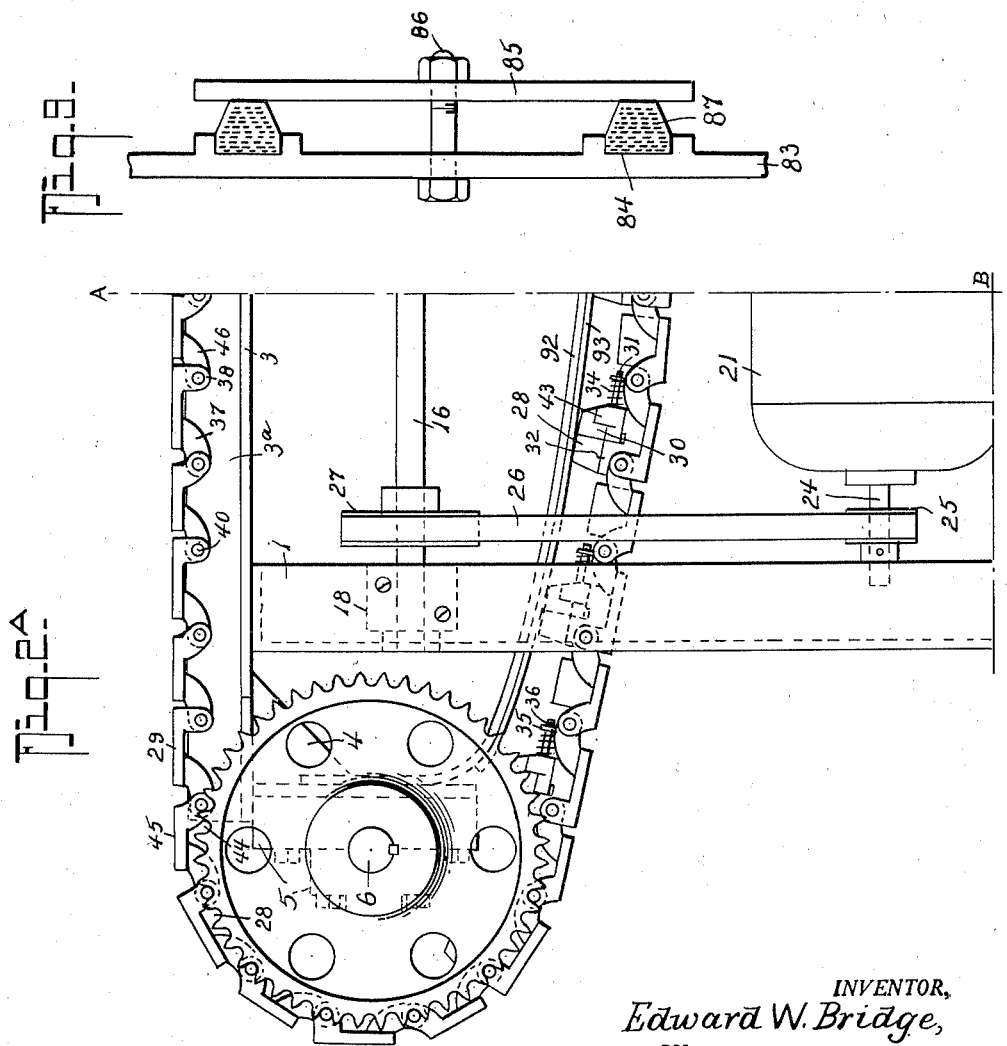

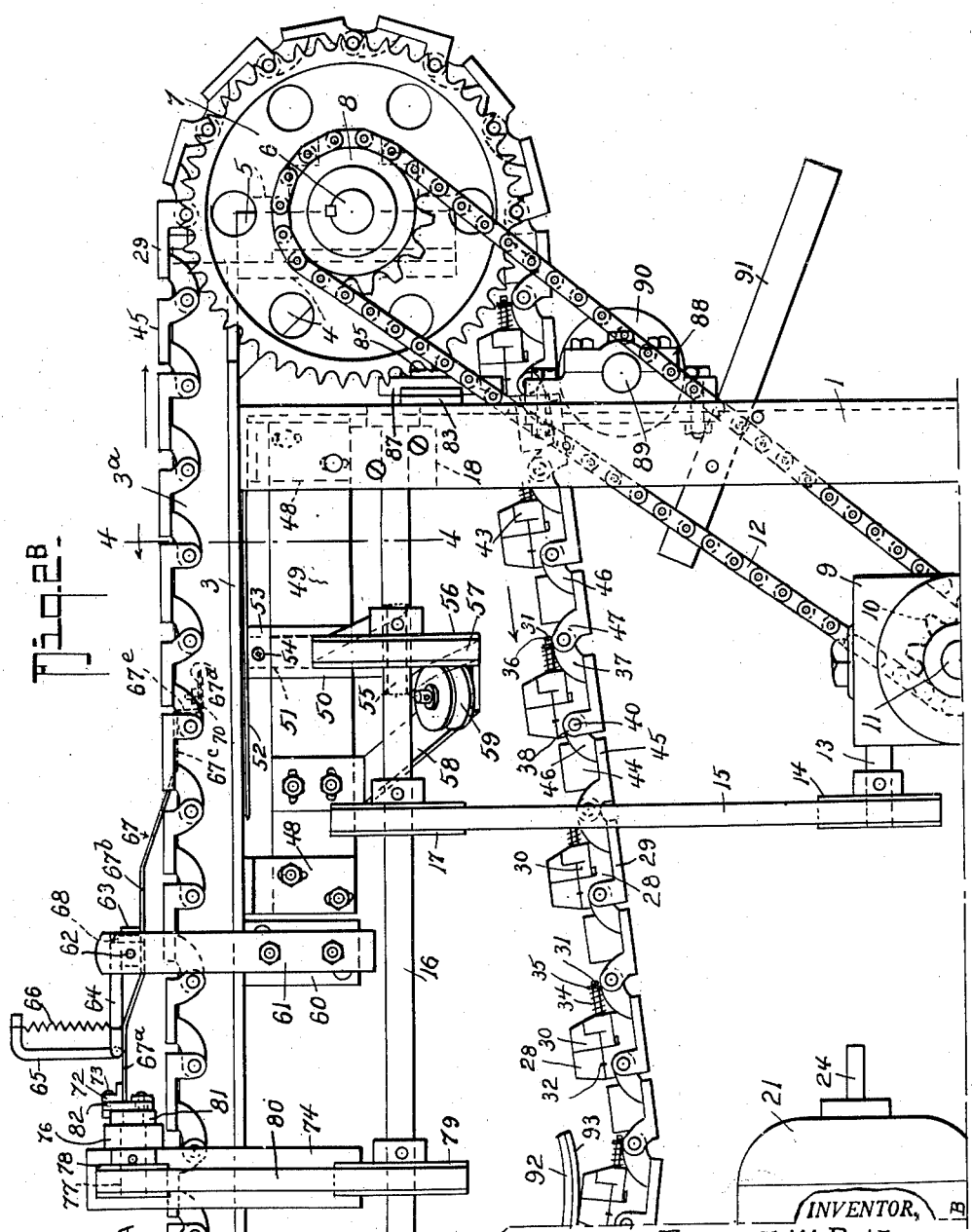

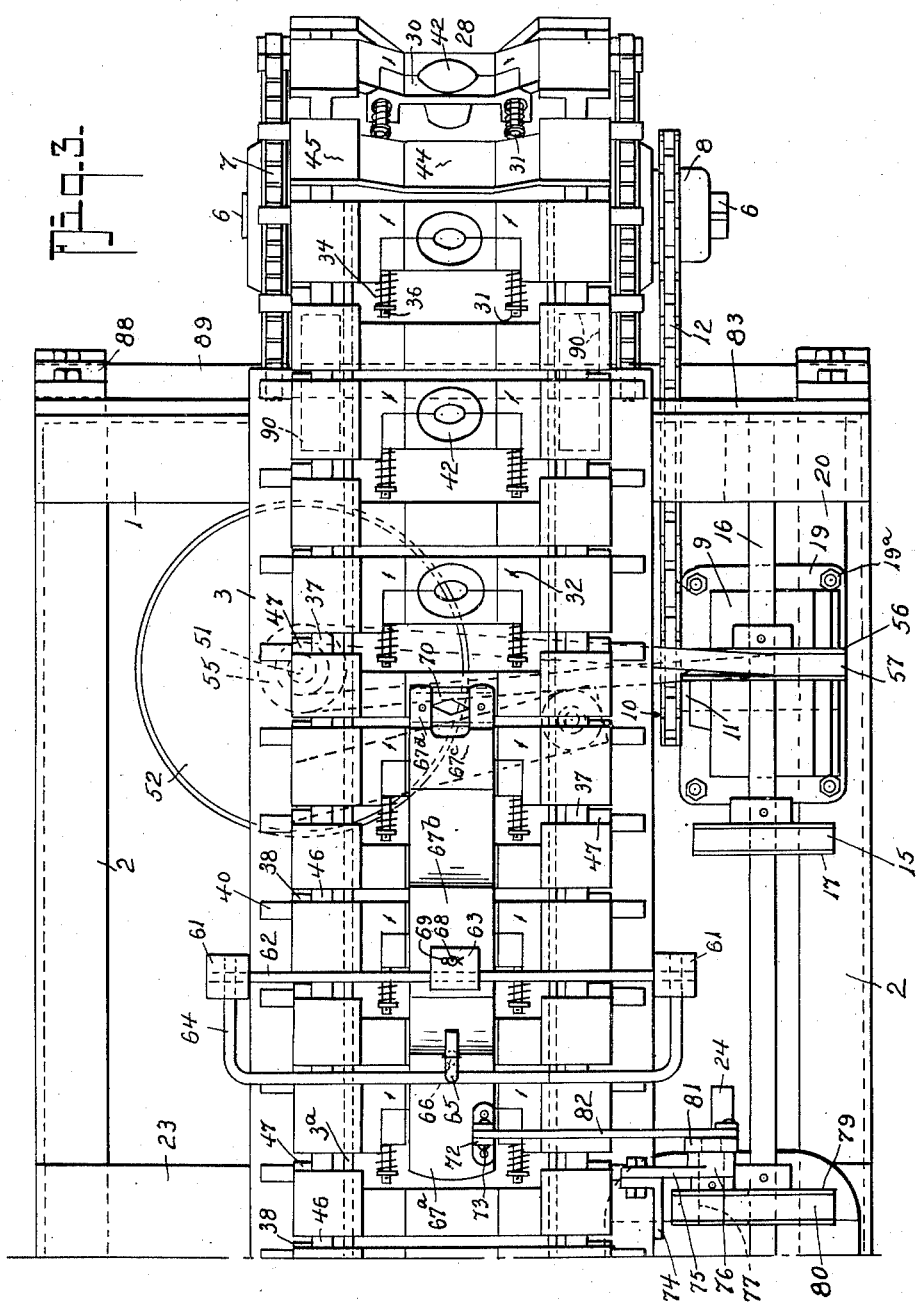

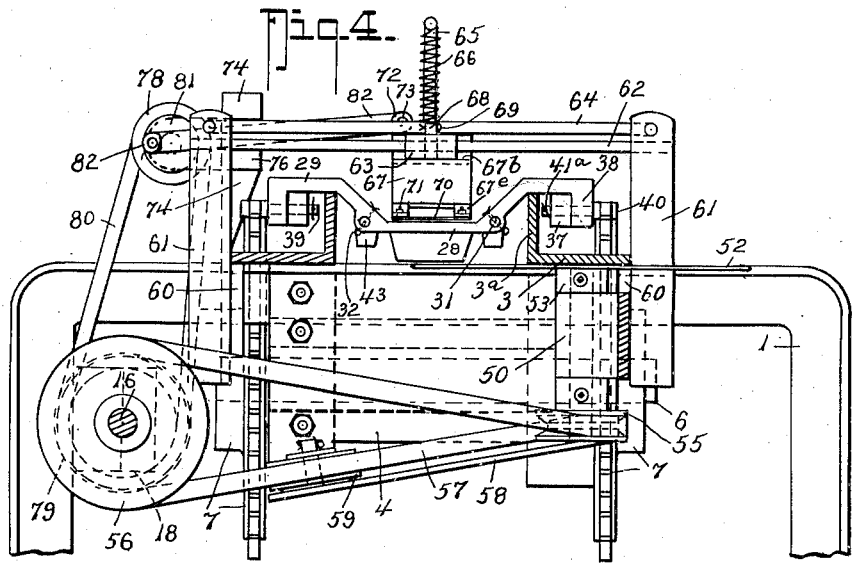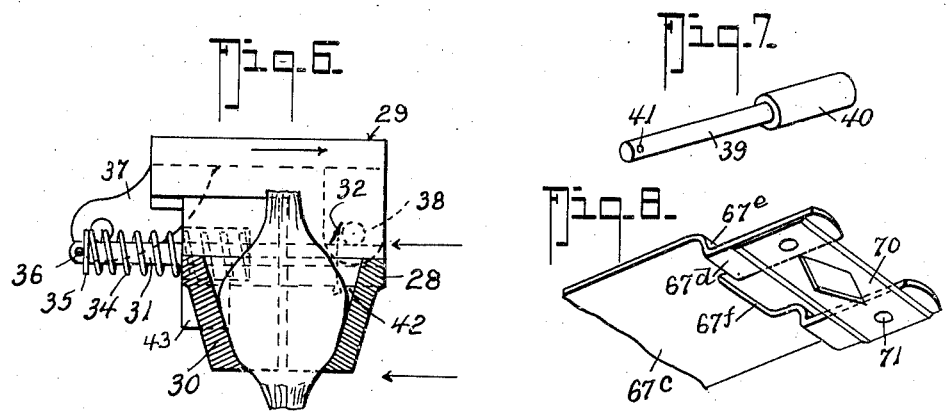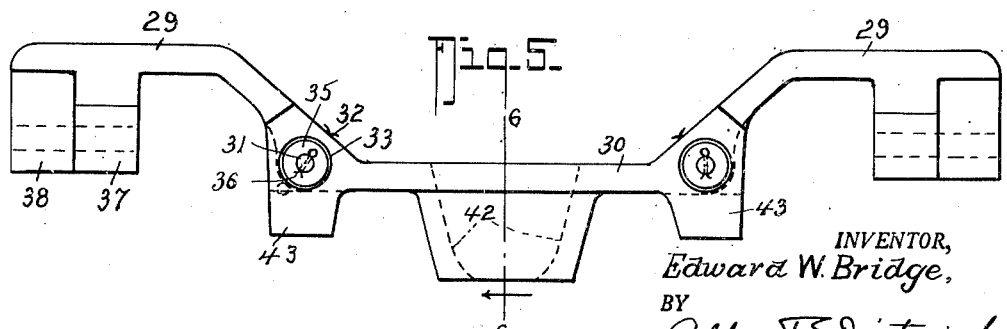

Patented Dec. 20, 1949

2,491,950

UNITED STATES PATENT OFFICE 2,491,950

VEGETABLE TRIMMING MACHINE

Edward W. Bridge, Philadelphia, Pa.

Application February 19, 1947, Serial No. 729,506

11 Claims. (Cl. 146—83)

My invention is a machine for trimming both the root end and the stem end of vegetables such as onions, and it particularly has for its objects: to provide a motor driven machine of a simple inexpensive construction which has provisions for trimming both ends of the vegetable at the same time while the vegetable is travelling forwardly in an endless conveyor; to provide such a machine with split-pocket links, into the pockets of which the onions to be trimmed are placed and held against accidental removal; to provide such machine with links whose pockets are somewhat tapered and each of which has a small hole in its center to permit the stem of the vegetable when placed in the pocket to come through far enough below the bottom surface for a moving knife to trim the stem as close to the body of the vegetable as desired.

Other objects will in part be obvious and in part will be pointed out hereinafter.

To the attainment of the aforesaid objects and ends, invention further resides in those novel details of construction, combination, and arrangements of parts, all of which will hereinafter be first described in detail and will then be specifically pointed out in the appended claims, reference being had to the accompanying drawings, in which:

Fig. 1 is a side elevation of my machine

Figs. 2A and 2B, when joined on the lines A—B, represent an enlarged side elevation of the upper part of the machine.

Fig. 3 is a top plan view of the parts shown in Fig. 2B.

Fig. 4 is a detail cross section on line 4—4 of Fig. 2B.

Fig. 5 is an enlarged elevation of one of the two-part or split-pocket links.

Fig. 6 is a cross section on line 6—6 of Fig. 5.

Fig. 7 is a detail perspective view of one of the sprocket engaging hinge pins.

Fig. 8 is a detail perspective view of the knife end of the upper cutter.

Fig. 9 is a detail plan view of a portion of the machine.

Fig. 10 is a view similar to Fig. 6, showing a modification.

In the drawings, in which like numeral and letters of reference indicate like parts in all the figures and in which is shown a preferred embodiment of the invention, I represents two inverted U-shaped angle-iron standards which are connected together at the top by parallel angle-iron tracks 3, and, at a lower level, by longitudinal angle irons or bars 2. Brackets 4, mounted on the under side of the tracks 3, carry shaft bearings 5 for the sprocket wheel shafts 6 on each of which a pair of sprocket wheels 7 is mounted.

On one shaft 6 is keyed a third sprocket 8 over which the conveyor driving chain 12 passes. The chain also passes about a sprocket 10 on a shaft 11 of a transmission gear mechanism. The shaft 11 is driven from a shaft 13 through suitable intergearing (not shown) within the gear box 9. The shaft 13 carries a V-type pulley 14 over which, and over a similar pulley 17 that is mounted on a countershaft 16, an endless V-type belt 15 passes. The countershaft 16 is journalled in suitable bearings 18 mounted on the standards 1 (Figs. 2A—2B). As best shown in Figs. 1 and 3, the gear box 9 has a base 19 by means of which, and four bolts 19a with nuts, the gear box is mounted for vertical adjustment on the base plate or bracket 20.

Mounted on cross bars 23 for vertical adjustment is a motor 21 whose base 22 is vertically adjustable in a manner similar to base plate 19 above referred to. The driving shaft 24 of the motor 21 carries a V-type pulley 25 about which, and a similar pulley 27 on the countershaft 16, a V-type belt 26 passes. The motor thus drives the countershaft, and the countershaft in turn drives the conveyor and other mechanism.

The endless conveyor in which the vegetables are placed and held for trimming is composed of alternate links of split or divided pockets and plain spacing or connecting links. Each of the divided pocket links comprises two sections 28, 30, the latter being movable toward and from the other to close and open the pockets 42. Each link section 28 has elevated ends 29 which ride on the upstanding portions 3a of the tracks 3.

The movable sections 30 slide along pins 31 that are secured in holes in the link sections 28 in any suitable way, as by cotter pins 32. The pin holes are counter-bored as at 33 to receive springs 34 which bear against washers 35 held at the outer ends of the pins 31 by cotter pins 36.

Each section 28 has pairs of hinge lugs 37 and 38 that connect with mating lugs 47 and 46 respectively of adjacent connecting or spacing links 44.

Hinge pins 39, having heads 40, connect the respective links 37, 47 and 38, 46, and are held in place by the heads 40 and cotter pins 41a passed through holes 41 (Figs. 4 and 7).

The sectional links have pockets 42 with large openings at the top and smaller openings at the bottom. These pockets may be shaped in cross section as shown in Fig. 6 or Fig. 10, or they may be of any other cross-sectional shape that may be found most effective for the intended purpose, as will later more fully appear. Each link 44 has elevated ends 45 also to ride on the track portions 3ª.

Each link section 30 on its under side is provided with lugs 43 through the medium of which the link sections are separated to discharge the product. This discharging function is effected by the engagement of the lugs 43 with yieldable fingers 87 designed to yield when the sections 30 shall have been opened their maximum distance, as will later more fully appear.

Mounted for vertical adjustment on brackets 48 that are welded or otherwise fixed to the tracks 3 (Fig. 2ᴮ) is a bar 49 carrying a bearing 50 for a knife spindle 51, to one end of which a disc knife blade 52 has its collar 53 secured as by a set screw 54. The spindle 51, at its other end, carries a pulley 55 over which, and a pulley 56 on shaft 16, a belt 57 passes. Pulleys 55 and 56 and belt 57 are preferably of the V-type.

A belt-tightening pulley 59 on an adjustable bracket 58 engages one flight of the belt 57 (Fig. 2ᴮ).

Brackets 60 on opposite sides of the machine are secured to the tracks 3 and carry side posts 61. The posts 61 carry a shaft 62 on which is mounted a block 63, to which block is held the pivot pin 68, of an oscillatable cutter bar 67, by a cotter pin 69. The posts 61 also carry a U-shaped, horizontally disposed bar 64 at the top center of which is a post 65 to which a spring 66 is anchored at one end. The cutter bar 67 is composed of stepped portions 67ª, 67ᵇ, 67ᶜ and 67ᵈ, the latter constituting fingers spaced apart and bridged by a cutter blade 70, preferably of the safety-razor type. The blade 70 is detachably held in place by bolts and nuts 71. The fingers are joined to the step 67ᶜ by a short riser 67ᵉ, the height of which determines the depth of the cut, as will later more fully appear. Both the step 67ᶜ and riser 67ᵉ are cut back somewhat as at 67ᶠ (see Fig. 8).

Pivoted at 73 between lugs 72 on the step 67ª is one end of a connecting rod 82, the other end of which is pivoted to a crank disc 81 on the end of a shaft 77 that is journalled in a bearing 76 of a bracket 75 that is secured to a support 74 welded or otherwise fixed to the track 3.

A V-type pulley 78 on shaft 77 is driven by a belt 80 from a V-type pulley 79 on the countershaft 16.

By reference to Figs. 2ᴮ, 3 and 9 it will be seen that the fingers 87 are held in grooves 84 of a cross bar 83 (that is secured, in any suitable way, to the uprights 1 of the member 1 at one end of the machine) by a clamping bar 85 and a bolt with nut 86.

Secured to the same uprights 1 are shaft bearings 88 for a roller-carrying shaft 89 on whose rollers 90 the top faces of the raised portions 29 and 45, when inverted, ride. The rollers 90 are so located with respect to the fingers 87 that the split links ride the rollers at the same time that the fingers function and prevent sagging of the conveyor.

The product may be discharged onto a chute 91 if desired.

In order to prevent the chain of links from running loose or rattling, the lower flight passes under a pressure shoe formed of a resilient bar 92 faced with a strip of suitable wear-reducing material 93.

From the foregoing it will be seen that I have provided a machine having a series of receptacles with adjustable pockets joined together with pins, so as to form a continuous chain. The receptacles have one side mounted on pins and are held closed by spring pressure so as to form adjustable pockets. The bottom of each receptacle, which forms the pocket, is somewhat tapered, having a small hole in the center to permit the stem end of the vegetable, such as an onion, when placed in the receptacle to come through far enough below the bottom surface for the moving knife to trim the stem of the vegetable as close to the body of the vegetable as desired. This variation is provided for by means of increasing or decreasing the size of the small hole in the bottom of the pocket of the receptacle. The adjustable part of the receptacle is held clamped together by the pressure of the two small coil springs. These two coil springs permit the adjustable part of the pocket to open to allow for the increased diameter of the vegetable. The larger the vegetable placed in the adjustable pocket of the receptacle, the larger the hole in the bottom becomes. This, in turn, permits a large vegetable to project further through the bottom of the pocket than would a small one, and allows the same proportionate amount of trimming as there would be on a smaller vegetable. In providing for a variation in the diameter of the vegetable-to-be-trimmed, the maximum diameter and the minimum diameter of the vegetables is taken into account. The pocket in the receptacle is made round and large enough to accommodate the maximum-diameter vegetable to be trimmed. The receptacle is cut away through the center portion sufficiently to allow the pocket to close by spring tension like a vise, so as to clamp a small vegetable in place, or the pocket can open a little more than the maximum diameter to permit the operator to place a large vegetable in the pocket of the receptacle and still have spring pressure to hold it in place.

As the chain of receptacles is moved forward, the receptacles ride and take their bearing on the two parallel rails. These two rails hold all of the receptacles in a fixed parallel position. As a receptacle travels forward with the vegetable clamped in the pocket, the rotating circular knife trims the top of the vegetable, which is projecting through the small hole in the bottom of the pocket of the receptacle. The sharp-edged knife meets the vegetable as it comes in contact with it and, while trying to pass the knife, the stem of the vegetable is snipped off in a motion similar to drawing a knife across its surface for cutting. At the location where the rotary knife edge first contacts the stem of the vegetable, the oscillating knife comes into action. This knife is so arranged as to cut the root end of the vegetable, taking off the same amount regardless of the height of the vegetable. The front end of this oscillating knife has a radius which makes it, in effect, a concave circular knife. On the opposite end of this knife from the blade, where the connecting rod is attached, is provided the spring tension 66 that holds this end of the knife against the parallel shaft 64 which is adjustable (by bending) up and down to prevent the cutting end of the knife from dropping down onto the chain of receptacles that carry the vegetables. As the vegetable travels forward, as before mentioned, and comes to the point of contact with the cutting knife under the pockets, it raises the upper knife, applying some tension on the spring on the back end of the knife, allowing the knife to rest on the extreme top of the root end of the vegetable. The off-set 67e adjacent the end of this cutting knife, where the blade portion is, is dropped down approximately ⅛ inch. This ⅛ inch governs the amount of root cut off from each vegetable. This is accomplished by having a fixed off-set, whether it is ⅛ inch or ¼ inch. The vegetable travels forward, holding the knife against the spring pressure and at the same time allowing the vegetable to move forward until it comes in contact with the cutting edge which, as heretofore mentioned, cuts the required amount off the root end of the vegetable and permits the small piece that is cut off to pass through the slot in the cutting knife.

It will be noted that both knives come in contact with the vegetable at the same time. This permits the clamping of the vegetable in the pocket with a light spring pressure. Both the lower and upper knives are pushing against the vegetable in the same direction at the same time; this prevents the vegetable from toppling over due to pressure of either one of the knives if they were not operating in unison.

The holder (see Fig. 9) for holding two pieces of heavy rubber-coated fabric belting, constituting the fingers 87, provides for adjusting the two fingers down or up to increase or decrease the amount that the fingers project out of the holder. This adjustment of the fingers provides an adjustment in the amount of pressure applied against the ejector lugs 43 on the adjustable portions of the pockets. If the fingers are projecting through the holder one inch, there will be much greater pressure applied against the ejector lugs than there would be if the fingers were projecting one-and-a-half or two inches. This adjustment is made to suit conditions. Providing rubber fingers to apply pressure against the ejector lugs first of all accomplishes prevention of unnecessary wear on the castings and, in addition, provides for a minimum amount of noise as the receptacles pass by the rubber fingers that apply pressure on the ejector lugs on the adjusting portion of the pockets against the two springs, and open the pocket for the vegetable to drop out.

It will also be seen that the auxiliary shaft 89 and the rollers 90 support the receptacle chain at the location where the rubber fingers come in contact with the ejector lugs. This allows the fingers to push against the ejector lugs instead of springing the chain away from the rubber strippers; or, in other words, it eliminates the sag in the bottom of the chain at that point. Also, the plain leather-faced shoe 92, 93 provides a slight pressure to ride against the chain on its return travel in order to eliminate the whip which occurs in continuously snapping from one set of ejector lugs to the other for ejecting the vegetables. As this machine is operating at approximately one hundred pockets per minute, a chain which is not stretched taut would otherwise develop a whipping action on the bottom. This shoe has a very light tension against the belt—just sufficient to keep it from jerking and bouncing on the rubber strippers as the chain is dragged past them.

Variations and modifications of the different parts of the machine will readily appear to those skilled in the art and I do not wish to be limited to the specific structures shown and described beyond the limitations specifically included in the appended claims.

From the foregoing description, taken in connection with the accompanying drawings, it is thought that the construction, operation, and advantages of the invention will be clear to those skilled in the art to which it relates.

What I claim is:

1. In a vegetable trimming machine, a suitable supporting frame, two parallel axles spaced apart and each having a pair of spaced-apart sprockets, parallel tracks extending between said axles, an endless chain of cross, parallel links, laterally projecting pivot pins connecting adjacent links together, the projecting portions of said pins riding said sprockets, means for turning said axles to effect movement of said chain along said tracks, certain of the links of said chain being composed each of two complementary parts one of which parts has elevated ends to ride said tracks and a depressed mid-portion, the other of said link parts having a similarly depressed mid-portion, the two mid-portions having a pocket between them, which pocket is open at the top and has a restricted opening in the bottom, said pocket serving to receive a vegetable with its stem projecting through said restricted opening and its root end projecting above the plane of the top of said depressed portions, yieldable means continuously tending to move said two parts of the links together to grip the vegetable between them, upper and lower knives, and means for mounting said knives on said frame in juxtaposition to the upper flight of said conveyor and in the paths of said root and stem ends of the vegetable in positions to trim the vegetable as it is carried past the knives.

2. In a vegetable trimming machine, a suitable supporting frame, two parallel axles spaced apart and each having a pair of spaced-apart sprockets, parallel tracks extending between said axles, an endless chain of cross, parallel links, laterally projecting pivot pins connecting adjacent links together, the projecting portions of said pins riding said sprockets, means for turning said axles to effect movement of said chain along said tracks, certain of the links of said chain being composed each of two complementary parts one of which parts has elevated ends to ride said tracks and a depressed mid-portion, the other of said link parts having a similarly depressed mid-portion, the two mid-portions having a pocket between them, which pocket is open at the top and has a restricted opening in the bottom, said pocket serving to receive a vegetable with its stem projecting through said restricted opening and its root end projecting above the plane of the top of said depressed portions, yieldable means continuously tending to move said two parts of the links together to grip the vegetable between them, a lower knife, means to mount said knife beneath the upper flight of said conveyor in juxtaposition to the path in which the under faces of the depressed portions of said links travel past said knife, an upper knife, and means to mount said upper knife on said frame above and in juxtaposition to the path in which the upper faces of said depressed portions travel in positions to trim the vegetable.

3. In a vegetable trimming machine, a suitable supporting frame, two parallel axles spaced apart and each having a pair of spaced-apart sprockets, parallel tracks extending between said axles, an endless chain of cross, parallel links, laterally projecting pivot pins connecting adjacent links together, the projecting portions of said pins riding said sprockets, means for turning said axles to effect movement of said chain along said tracks, certain of the links of said chain being composed each of two complementary parts one of which parts has elevated ends to ride said tracks and a depressed mid-portion, the other of said link parts having a similarly depressed mid-portion, the two mid-portions having a pocket between them, which pocket is open at the top and has a restricted opening in the bottom, said pocket serving to receive a vegetable with its stem projecting through said restricted opening and its root end projecting above the plane of the top of said depressed portions, yieldable means continuously tending to move said two parts of the links together to grip the vegetable between them, a lower knife, means to mount said knife beneath the upper flight of said conveyor in juxtaposition to the path in which the under faces of the depressed portions of said links travel past said knife, an upper knife, said upper knife including a flat blade carried on an arm, means for mounting said arm on said frame to be oscillatable about an axis normal to said blade and the plane of the upper surface of the depressed portions of the passing links, and means to oscillate said arm.

4. As an article of manufacture, a conveyor link for vegetable trimming machines, comprising a body U-shaped in front elevation to provide a depressed central portion and two elevated end-portions, the elevated portions on their under sides each having a pair of hinge lugs off-set one from the other, a second body complementary to the first body and having pin-holes, guide pins secured to the first body and passing through said pin-holes for mounting the second body on the first body, spring means on said pins for continuously tending to hold said bodies together as a clamp, the mid-portions of said bodies having a combined protuberance beneath the same, which protuberance has a pocket open through the top of the depressed portions of said bodies to receive a vegetable to be trimmed.

5. As an article of manufacture, a conveyor link for vegetable trimming machines, comprising a body U-shaped in front elevation to provide a depressed central portion and two elevated end-portions, the elevated portions on their under sides each having a pair of hinge lugs off-set one from the other, a second body complementary to the first body and having pin-holes, guide pins secured to the first body and passing through said pin-holes for mounting the second body on the first body, spring means on said pins for continuously tending to hold said bodies together as a clamp, the mid-portions of said bodies having a combined protuberance beneath the same, which protuberance has a pocket open through the top of the depressed portions of said bodies, and a smaller opening through the bottom of said protuberance by virtue of all of which a vegetable may be held in said pocket with its stem projecting through said smaller opening and its root end held above the top opening of said pocket.

6. In a vegetable trimming machine, an endless-chain-of-links conveyor, means for holding a vegetable in links of said conveyor with the stem and root ends projecting from the conveyor, two knives located adjacent said conveyor for engaging and trimming, respectively, the root and stem ends of the vegetable, and means for operating said conveyor to move the vegetable past said knives, one of said knives including a flat blade carried on an arm, a frame on which said conveyor is mounted, means for mounting said arm on said frame to be oscillatable about an axis normal to said blade, and means to oscillate said arm and means cooperating with said arm and its mounting means for effecting adjustment of said blade to different length onions.

7. In a machine of the class described, a frame, two axles journalled in bearings in said frame, two sprockets on each axle, a single endless chain conveyor composed of links, each of said links comprising a body U-shaped in front elevation to provide a depressed central portion and two elevated end portions, the elevated portions on their under sides each having a pair of hinge lugs off-set one from the other, a second body complementary to the first body and having pin-holes, guide pins secured to the first body and passing through said pin-holes for mounting the second body on the first body, spring means on said pins for continuously tending to hold said bodies together as a clamp, the mid-portions of said bodies having a combined protuberance beneath the same, which protuberance has a pocket open through the top of the depressed portions of said bodies to receive a vegetable to be trimmed, hinge pins connecting the hinge lugs of adjacent links and having heads to engage and ride said sprockets.

8. In a machine of the class described, a frame, two axles journalled in bearings in said frame, two sprockets on each axle, a single endless chain conveyor composed of links, each of said links comprising a body U-shaped in front elevation to provide a depressed central portion and two elevated end portions, the elevated portions on their under sides each having a pair of hinge lugs off-set one from the other, a second body complementary to the first body and having pin-holes, guide pins secured to the first body and passing through said pin-holes for mounting the second body on the first body, spring means on said pins for continuously tending to hold said bodies together as a clamp, the mid-portions of said bodies having a combined protuberance beneath the same, which protuberance has a pocket open through the top of the depressed portions of said bodies to receive a vegetable to be trimmed, hinge pins connecting the hinge lugs of adjacent links and having heads to engage and ride said sprockets, a lower knife mounted beneath the upper flight of said conveyor and adjacent the path in which the under faces of the depressed portions of said links travel past said knife, an upper knife including a flat blade carried on an arm, means to mount said arm on said frame to be oscillatable about an axis normal to said blade and the plane of the upper surface of said depressed portions of the passing links, and means to oscillate said arm.

9. In a vegetable trimming machine, an endless-chain-of-links conveyor, means for holding a vegetable in links of said conveyor with the stem and root ends projecting from the conveyor, two knives located adjacent said conveyor for engaging and trimming, respectively, the root and stem ends of the vegetable, and means for operating said conveyor to move the vegetable past said knives, one of said knives including a flat blade carried on an arm, a frame on which said conveyor is mounted, means for mounting said arm on said frame to be oscillatable about an axis normal to said blade, and means to oscillate said arm, said arm being also pivotally mounted on a transverse axis and being provided with an inclined portion for engagement by the vegetable to adjust the knife automatically to different sizes of vegetables approaching the knife blade.

10. In a vegetable trimming machine, an endless conveyor composed of links certain ones of which comprise two normally contacting complementary parts having a pocket formed, in part, in each of said complementary parts, the top and bottom of said pocket being open to permit projection of the parts of the vegetable to be cut off, one of said complementary parts having rigid guide pins on which the other of said complementary parts has sliding movement toward and from the first of said complementary parts, springs on said pins continuously tending to move the slidable link part toward the other link part, sprockets over which the conveyor passes, means to trim vegetables held in said pocket, means to effect separation of said link parts at a predetermined place to drop out the trimmed vegetable, and upper and lower cutters located adjacent the conveyor and operating to sever the projecting parts of the vegetable as the vegetable passes the cutters.

11. In a vegetable trimming machine, an endless conveyor composed of links certain ones of which comprise two normally contacting complementary parts having a pocket formed, in part, in each of said complementary parts, the top and bottom of said pocket being open to permit projection of the parts of the vegetable to be cut off, one of said complementary parts having rigid guide pins on which the other of said complementary parts has sliding movement toward and from the first of said complementary parts, springs on said pins continuously tending to move the slidable link part toward the other link part, sprockets over which the conveyor passes, means to trim vegetables held in said pocket, means to effect separation of said link parts at a predetermined place to drop out the trimmed vegetable, said last named means comprising lugs on the slidable link part and fixedly located fingers for engaging said lugs to effect separation of the link parts as they pass the fingers, and upper and lower cutters located adjacent the conveyor and operating to sever the projecting parts of the vegetable as the vegetable passes the cutters.

EDWARD W. BRIDGE.

REFERENCES CITED

The following references are of record in the file of this patent:

UNITED STATES PATENTS

| Number | Name | Date |
| --- | --- | --- |
| 1,077,899 | Woodring | Nov. 4, 1913 |
| 1,802,294 | Walker | Apr. 21, 1931 |
| 1,901,042 | Robbins | Mar. 14, 1933 |
| 1,995,694 | Urschel | Mar. 26, 1935 |
| 2,062,739 | Canaday | Dec. 1, 1936 |
| 2,109,365 | Carll et al. | Feb. 22, 1938 |
| 2,158,977 | Douthitt | May 16, 1939 |
| 2,429,346 | Dunn | Oct. 21, 1947 |